UNITED STATES PATENT OFFICE.

OSKAR NAUSS, OF BRESLAU, GERMANY.

PROCESS OF MANUFACTURING GAS FOR INFLATING AEROSTATS.

965,482. Specification of Letters Patent. Patented July 26, 1910.

No Drawing. Application filed February 12, 1910. Serial No. 543,554.

*To all whom it may concern:*

Be it known that I, OSKAR NAUSS, a subject of the German Emperor, and residing at Breslau, German Empire, have invented certain new and useful Improvements in Processes of Manufacturing Gas for Inflating Aerostats, of which the following is a specification.

Hitherto the aerostats or buoyant bodies of aerial machines have been inflated almost always either with illuminating gas or hydrogen gas. The former gas, however, is relatively heavy and is therefore usually employed only for non-steered balloons. Hydrogen gas, again, meets the demands made by the navigable balloon in point of specific gravity and thus of buoyancy and carrying power; but according to present methods it is troublesome to manufacture in large quantities and is thus relatively expensive.

The present invention relates to a process of converting into technically pure hydrogen gas, and thus rendering suitable for the inflation of navigable balloons, the crude or the purified illuminating gas of gas works, which, as is well known, consists substantially of hydrocarbons, hydrogen gas and carbonic oxid.

It is a familiar fact that if illuminating gas is exposed to very high temperatures the percentage of hydrogen increases, owing to the decomposition of hydrocarbons. It is also a well-known fact that if a mixture of carbonic oxid and hydrogen is conducted over catalytic agents, the carbonic oxid is converted into methane, which, again, by heating to a high temperature, is decomposed into carbon and hydrogen. Further, it has already been proposed in the case of gases obtained by dry distillation, to free them from carbonic oxid and hydrocarbons—hydrogen taking their place—by allowing the gases to act upon metallic nickel or cobalt at a temperature not exceeding dark red heat (350–450 degrees centigrade). The carbonic oxid is decomposed into carbonic acid and carbon, which latter, bound by the nickel or cobalt, can, by passing steam over it, also be oxidized to form carbonic acid, hydrogen being liberated. In this process, therefore, very large quantities of carbonic acid are formed and have to be subsequently removed from the final gas obtained. Moreover, the conversion of the carbonic oxid into carbonic acid in the presence of hydrogen is but incomplete, since there is always more or less methane present, depending upon the quantity of hydrogen present. Furthermore, at the low temperature mentioned, the hydrocarbons present are very slightly—up to about one fifth of their volume—decomposed, and are thus to be found to a large extent in the resultant gas.

According to my new process the illuminating gas is passed over catalytic agents, whereby the specifically relatively heavy carbonic oxid is converted into methane. Hereupon, by the suitable employment of high temperatures, the mixture, now consisting substantially of hydrocarbons and hydrogen, is converted into almost pure hydrogen, carbon being separated out. The reactions which take place, proceed more rapidly and effectively if the initial gas is also exposed to the influence of high temperatures before being conducted over the catalytic agents, whereby the heavy hydrocarbons are decomposed, since these, as experience shows, influence the action of the catalyzing substances. Further, in this manner, owing to the higher percentage of hydrogen in the gas prior to its being conducted to the catalytic agents, the conversion of the carbonic oxid into methane is further favored by increased molar action.

The reactions upon which the process is based, are as follows:

(1) $C_2H_4 = C + CH_4 = 2C + 2H_2$
(2) $CO + 3H_2 = CH_4 + H_2O$
(3) $CH_4 = 2H_2 + C$.

The new process can be carried out with the aid of the vertical or inclined retorts or chamber-ovens such as are employed in all gas and coke works; or any other appropriate oven with suitably heated vertical retort or chamber may be used. The retort or chamber is charged with suitable material presenting a large surface (preferably coke, or clay or the like mixed with iron, cobalt, nickel, etc.), and is preferably heated from the outside. With a view to raising the temperature more rapidly, the heating may at the commencement also be carried on from within, and air supplied by means of a blower. The gas to be decomposed is now conducted through the retort. If the gas is conducted with a suitable velocity and a sufficiently high temperature maintained in the layer of incandescent coke,—about 1000–1200 degrees centigrade—, the hydrocarbons will be rapidly decomposed.

After the gas has left the retorts or chambers in which it has passed over the incandescent coke, it enters a vessel containing nickel or cobalt as catalytic agent. Clay may be employed as carrier of the catalytically acting metals. At the temperature of about 250-300 degrees centigrade the carbonic oxid is converted with the excess of hydrogen present into methane and steam. The gas, freed from the steam by cooling, will now consist substantially of methane and hydrogen. The gas is then again passed at a high temperature—about 1000-1200 degrees centigrade—through a retort or chamber charged with incandescent coke (charcoal) or clay (mixed with nickel, cobalt or iron). The action is similar to that at the commencement of the process and the methane is split up into carbon and hydrogen. The gas so obtained is freed from the entrained carbon in well-known manner, and, depending upon the particular requirements of the case, stored in a vessel, or after sufficient cooling let direct into the aerostats. It consists of technically pure hydrogen and exceeds the original quantity of gas employed by about one-fifth of the volume.

Instead of illuminating gas, a mixture of illuminating gas and water gas might be employed. The procedure in this case also takes place in similar manner to that when illuminating gas alone is used. The higher percentage of hydrogen gas and the lower percentage of heavy hydrocarbons favor the conversion of carbonic oxid into methane.

Having thus described my invention, I declare that what I claim as new, and desire to secure by Letters Patent is—

1. The process of manufacturing a gas suitable for the inflation of aerostats, consisting in passing coal gas over catalytic agents at a suitable temperature, for the purpose of converting the carbonic oxid present into methane; in subjecting it to a high temperature, whereby the methane is split up into carbon and hydrogen; and in finally freeing it from carbon in suitable manner; whereby a gas consisting substantially of hydrogen is obtained.

2. The process of manufacturing a gas suitable for the inflation of aerostats, consisting in submitting coal gas to high temperatures, in order to decompose heavy hydrocarbons; in passing it over catalytic agents at a suitable temperature, for the purpose of converting the carbonic oxid present into methane; in subjecting it to a high temperature, whereby the methane is split up into carbon and hydrogen; and in finally freeing it from carbon in suitable manner; whereby a gas consisting substantially of hydrogen is obtained.

3. The process of manufacturing a gas suitable for the inflation of aerostats, consisting in mixing together coal gas and water gas; in passing the mixture of coal gas and water gas over catalytic agents at a suitable temperature, for the purpose of converting the carbonic oxid present into methane; in subjecting it to a high temperature, whereby the methane is split up into carbon and hydrogen; and in finally freeing it from carbon in suitable manner; whereby a gas consisting substantially of hydrogen is obtained.

In testimony whereof I affix my signature in presence of two witnesses.

OSKAR NAUSS.

Witnesses:
SIEGFRIED LUSTIG,
LOUIS KATZ.